US009544720B2

(12) United States Patent
Des Jardins (10) Patent No.: US 9,544,720 B2
(45) Date of Patent: Jan. 10, 2017

(54) INFORMATION DELIVERY TARGETING (71) Applicant: Comcast Cable Communications, LLC., Philadelphia, PA (US)

(72) Inventor: George Thomas Des Jardins, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 182 days.

(21) Appl. No.: 13/836,239

(22) Filed: Mar. 15, 2013

(65) Prior Publication Data

US 2014/0274144 A1 Sep. 18, 2014

(51) Int. Cl.
*H04W 4/02* (2009.01)
*H04L 29/08* (2006.01)
*H04N 21/258* (2011.01)
*H04N 21/45* (2011.01)
*H04N 21/472* (2011.01)
*H04N 21/4788* (2011.01)

(52) U.S. Cl.
CPC .......... *H04W 4/02* (2013.01); *H04L 29/08657* (2013.01); *H04L 67/18* (2013.01); *H04N 21/25841* (2013.01); *H04N 21/4524* (2013.01); *H04N 21/4532* (2013.01); *H04N 21/47202* (2013.01); *H04N 21/4788* (2013.01)

(58) Field of Classification Search
CPC ... H04W 64/00; H04W 4/02; H04L 29/08657; H04L 67/16; H04L 67/18; H04L 67/20; H04L 67/22; H04L 67/30; H04N 21/47202; H04N 21/4532; H04N 21/25891; H04N 21/25841; H04N 21/4524; H04N 21/42204; H04N 21/2393; H04N 21/4122; H04N 21/4753; H04N 21/8133; H04N 21/472; H04N 21/44008; H04N 21/43615; H04N 21/4394; H04N 21/25883; H04N 21/4523; H04N 21/4788
USPC ......... 455/404.2, 456.1, 456.2, 456.3, 556.1, 455/556.2, 557, 566
See application file for complete search history.

(56) References Cited

U.S. PATENT DOCUMENTS 6,563,430 B1   5/2003  Kemink et al.
8,412,798 B1 *  4/2013  Wang ............................ 709/217
(Continued)

FOREIGN PATENT DOCUMENTS

EP        2017724 A1      1/2009
WO     2012/040385 A1     3/2012

OTHER PUBLICATIONS

Extended European Search Report—EP14159469.7—Mailing date: Nov. 10, 2014.

(Continued)

*Primary Examiner* — Magdi Elhag
(74) *Attorney, Agent, or Firm* — Banner & Witcoff, Ltd.

(57) ABSTRACT

Information may be more specifically targeted to locations or individuals based on contextual information derived from user input, environmental information, device attributes and the like. A more precise location, in some examples, may be determined based on user-specified information such as a name of a device. In other examples, user input such as commands and queries may be used to determine further attributes of a particular location, of a device and/or of a user. Such information may then be used as parameters for filtering and selection of information such as advertisements, movies, books, shows, articles and the like to a specific location, device and/or user.

20 Claims, 6 Drawing Sheets

(56) References Cited

U.S. PATENT DOCUMENTS

| | | | |
|---|---|---|---|
| 2004/0221304 A1* | 11/2004 | Sparrell et al. | 725/34 |
| 2009/0019394 A1* | 1/2009 | Sekimoto et al. | 715/811 |
| 2009/0164929 A1 | 6/2009 | Chen et al. | |
| 2010/0211431 A1* | 8/2010 | Lutnick | G06Q 30/02 705/14.12 |
| 2011/0254683 A1 | 10/2011 | Soldan et al. | |
| 2011/0289532 A1 | 11/2011 | Yu et al. | |
| 2012/0079126 A1* | 3/2012 | Evans et al. | 709/230 |
| 2012/0263020 A1* | 10/2012 | Taylor et al. | 367/124 |
| 2012/0304206 A1 | 11/2012 | Roberts et al. | |

OTHER PUBLICATIONS

Partial European Search Report—EP14159469.7—Mailing date: Jul. 30, 2014.
Anonymous: "Siri", Mar. 13, 2013 (Mar. 12, 2013). XP055130819. Retrieved from the Internet: URL:http://en.wikipedia.org/w/index.php?title=Siri&oldid=543671891 [retrieved on Jul. 22, 2014].

* cited by examiner

INFORMATION DELIVERY TARGETING

TECHNICAL FIELD

Aspects of the disclosure relate to location-aware information delivery.

BACKGROUND

Improving technology has offered increasing amounts of information about individuals, families and other entities. Entities like advertisers and content providers have sought to use such information for targeted information delivery including directed advertising, music and other audio content offerings, book recommendations, video content delivery and the like. However, granularity and user of such information has thus far been limited.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

According to one or more aspects, a system for information targeting and delivery may provide or enable targeting of content and other types of information with increased granularity and specificity. Moreover, according to some examples, the system may further infer or extract information from known or learned location information to further enhance targeting of information delivery. In some examples, the system may use known or learned information to further identify locations with additional granularity. Additionally or alternatively, user input may be used as a basis for further refining information targeting and delivery. User and/or device co-location may also serve as a basis for selecting information and determining a time at which to deliver the information.

The details of these and other embodiments of the present disclosure are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the invention may be practiced. For example, an information targeting and delivery system may use not only geographic location information gleaned from sources such as global positioning satellite (GPS) systems and/or network location information, but also user-specified location data for additional specificity. In one example, user-specified names or other tags and attributes assigned to devices within a location (e.g., a home, a building, a business, etc.) may offer further information to identify sub-locations. The information targeting and delivery system may thus increase the specificity of the information targeting based on a functionality or other attributes of the sub-location. In some examples, a system may determine the functionality and other attributes of the location or sub-location based on user provided input, co-location analysis, content previously delivered to the location or sub-location and the like and/or combinations thereof. It is to be understood that other embodiments may be utilized and structural and functional modifications may be made without departing from the scope of the present disclosure.

Figure 1:
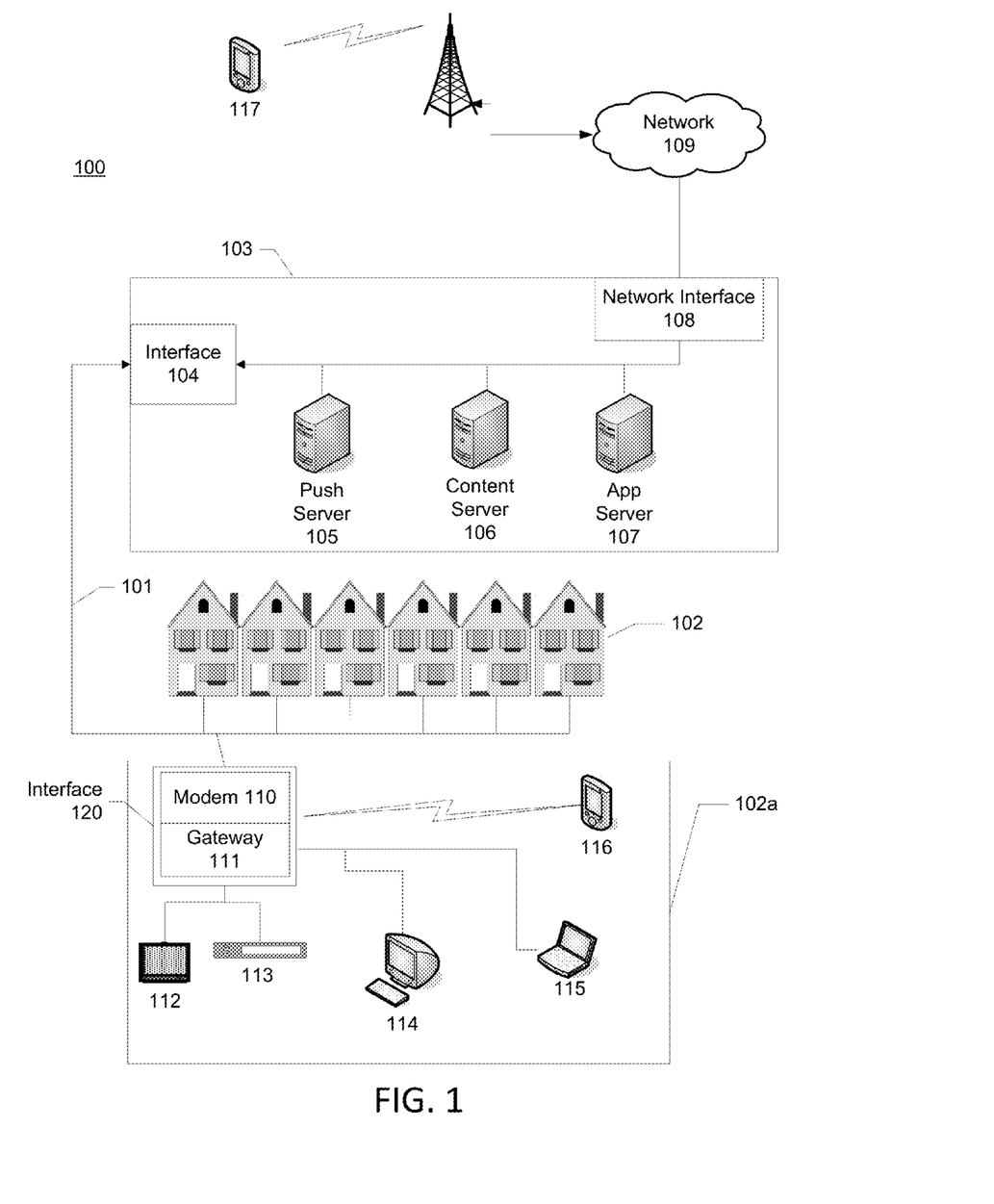
FIG. 1 illustrates an example system in which various features discussed herein may be implemented.

FIG. 1 illustrates an example information distribution network 100 on which many of the various features described herein may be implemented. Network 100 may be any type of information distribution network, such as a satellite network, a telephone network, a cellular network, a wireless network, and/or combinations thereof. For example, network 100 may be an optical fiber network, a coaxial cable network, or a hybrid fiber/coax (HFC) distribution network. Such a network 100 can use a series of interconnected communication links 101 (e.g., coaxial cables, optical fibers, wireless connections, etc.) to connect multiple premises 102 (e.g., businesses, homes, consumer dwellings, etc.) to a local office 103 (e.g., a headend, a central office, a processing facility, etc.). The local office 103 may transmit downstream information signals onto the links 101, and each premises 102 may have a receiver that can be used to receive and process those signals. The geographic location of the local office 103 can vary, and the local office 103 may be proximate to a user's neighborhood in some embodiments, while in other embodiments, the local office 103 may be located remotely at a centralized location. The various servers can be located anywhere, and their location might not be relevant to a user (e.g., the servers may be in the "cloud").

In some arrangements, there may be one link 101 originating from the local office 103, and it may be split a number of times to distribute the signal to various premises 102 in the vicinity (which may be many miles) of the local office 103. The links 101 may include components that are not illustrated, such as splitters, filters, amplifiers, etc., to help convey the signal clearly, but in general each split may introduce a bit of signal degradation. Some portions of the links 101 also may be implemented with fiber-optic cable, while other portions may be implemented with coaxial cable, other lines, or wireless communication paths.

The local office 103 may include an interface 104, such as a termination system (TS) or a cable modem termination system (CMTS) in an example of an HFC-type network, which may be a computing device that is configured to manage communications between devices on the network of links 101 and backend devices, such as servers 105, 106, and 107 (which are discussed further below). In the example of an HFC-type network, the TS may be as specified in a standard, such as the Data Over Cable Service Interface Specification (DOCSIS), published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks, Internet devices, telephone networks, cellular telephone networks, fiber optic networks, local wireless networks (e.g., LTE, WiMAX, etc.), satellite networks, and any other desired network, and the interface 108 may include the corresponding circuitry needed to communicate on the network 109, and to communicate with other devices on the network, such as a cellular telephone network and its corresponding cell phones. Collectively, these networks 109 may be referred to herein as "the cloud" or "cloud architecture."

As noted above, the local office 103 may include a variety of servers that may be configured to perform various functions. For example, the local office 103 may include a back office server 105. The back office server 105 may generate push notifications related to functions, such as billing, reporting, and subscriber management to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users, who may be, for example, in the premises 102 (e.g., homes). In some embodiments, the content server 106 may include software to validate (or initiate the validation of) user identities and entitlements, locate and retrieve (or initiate the location and retrieval of) requested content, encrypt the content, and initiate delivery (e.g., streaming, transmitting via a series of content fragments) of the content to the requesting user and/or device. Other server computing devices may be present as well. Also, the various servers and elements are depicted in a local office 103, but they need not be co-located in a common premises, and instead may have some or all elements located remotely in the network 109.

The local office 103 may also communicate with one or more application servers 107 maintained in the cloud 109. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX, and COMET). For example, an application server 107 may be responsible for collecting television program listings information and generating a data download for electronic program guide listings. Another application server 107 may be responsible for monitoring user viewing habits and collecting that information for use in selecting advertisements. Another application server may be responsible for formatting and inserting advertisements in a video stream and/or content item being transmitted to the premises 102. As discussed below, still another application server 107 may be used to monitor and/or otherwise communicate with one or more security systems that may be deployed at various locations, such as the premises 102.

An example premises 102a may include an interface 120, which may include a modem 110 (or another receiver and/or transmitter device suitable for a particular network), which may include transmitters and receivers used to communicate on the links 101 and with the local office 103. The modem 110 may be, for example, a coaxial cable modem (for coaxial cable lines 101), a fiber interface node (for fiber optic links 101), or any other desired modem device. The modem 110 may be connected to, or be a part of, a gateway interface device 111. The gateway interface device 111 may be a computing device that communicates with the modem 110 to allow one or more other devices in the premises 102a to communicate with the local office 103 and other devices beyond the local office. The gateway 111 may be a set-top box (STB), digital video recorder (DVR), computer server, or any other desired computing device. The gateway 111 may also include local network interfaces (not shown) that can provide communication signals to other devices in the premises 102a (e.g., user devices), such as televisions 112, additional STBs 113, personal computers 114, laptop computers 115, wireless devices 116 (wireless laptops and networks, mobile phones, mobile televisions, tablet computers, PDA, etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), 4G, WiMAX, LTE, Bluetooth interfaces, and others. In some embodiments, the system may use ZigBee and Z-Wave compliant devices.

Figure 2:
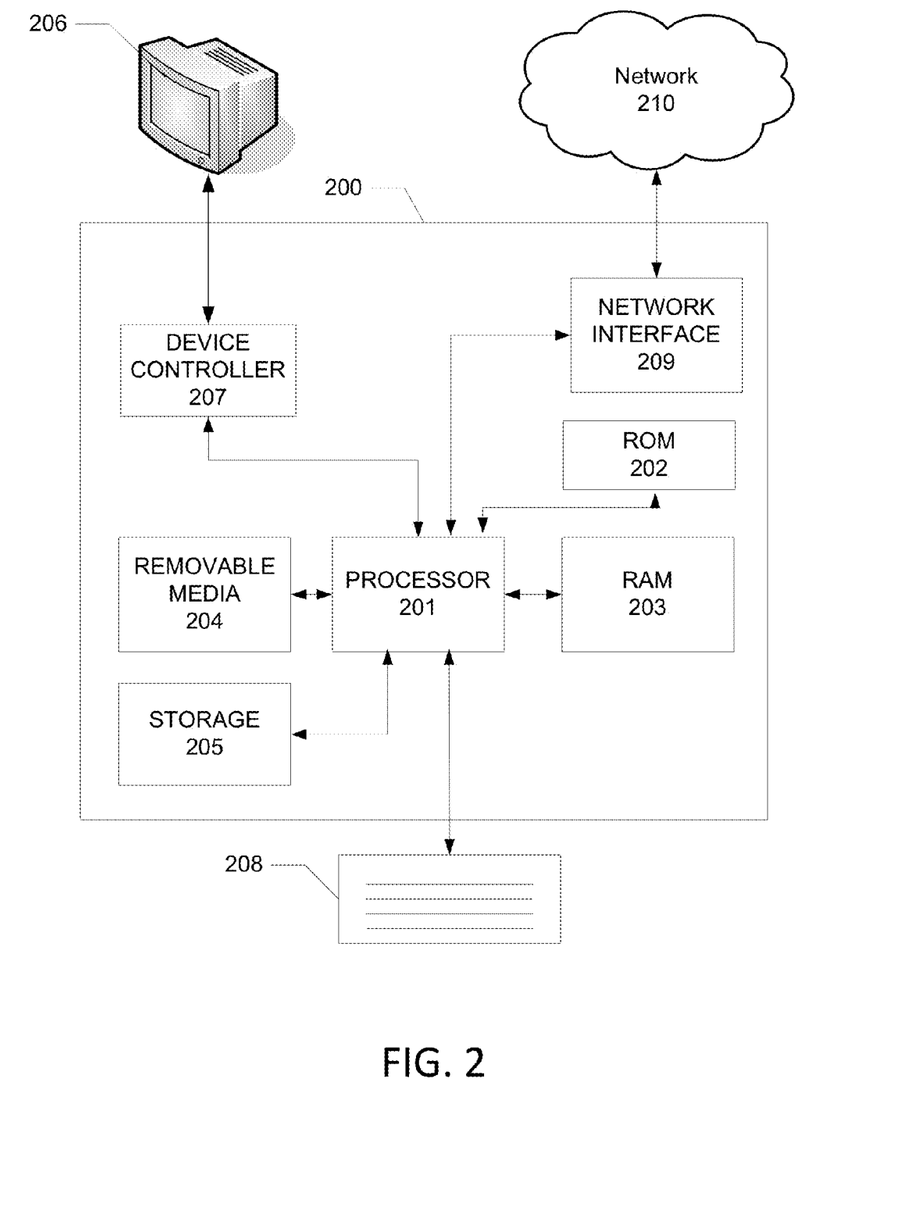
FIG. 2 illustrates an example computing device that may be used to implement any of the computing devices and servers discussed herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces 209, such as input/output circuits (such as a network card) to communicate with an external network 210. The network interface 209 may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

FIG. 2 shows an example hardware configuration. Modifications may be made to add, remove, combine, divide, etc., components as desired. Additionally, the components illustrated may be implemented using basic computing devices and components, and the same components (e.g., processor 201, ROM 202, user input devices 208, etc.) may be used to implement any of the other computing devices and components described herein. For example, the various components herein may be implemented using computing devices having components such as a processor executing computer-executable instructions stored on a computer-readable medium (e.g., storage 205), as illustrated in FIG. 2.

One or more aspects of the disclosure may be embodied in computer-usable data and/or computer-executable instructions, such as in one or more program modules, executed by one or more computers or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media, such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents, such as integrated circuits, field programmable gate arrays (FPGAs), and the like. Particular data structures may be used to more effectively implement one or more aspects of the invention, and such data structures are contemplated as being within the scope of computer executable instructions and computer-usable data described herein.

Having described an example of an information distribution network and an example of a computing device that may be used in implementing various aspects of the disclosure, several examples illustrating how information including advertisements, programming, other types of audio and video, articles, websites, and the like may be targeted and delivered based on granular location data and contextual information will now be described in greater detail.

Figure 3:
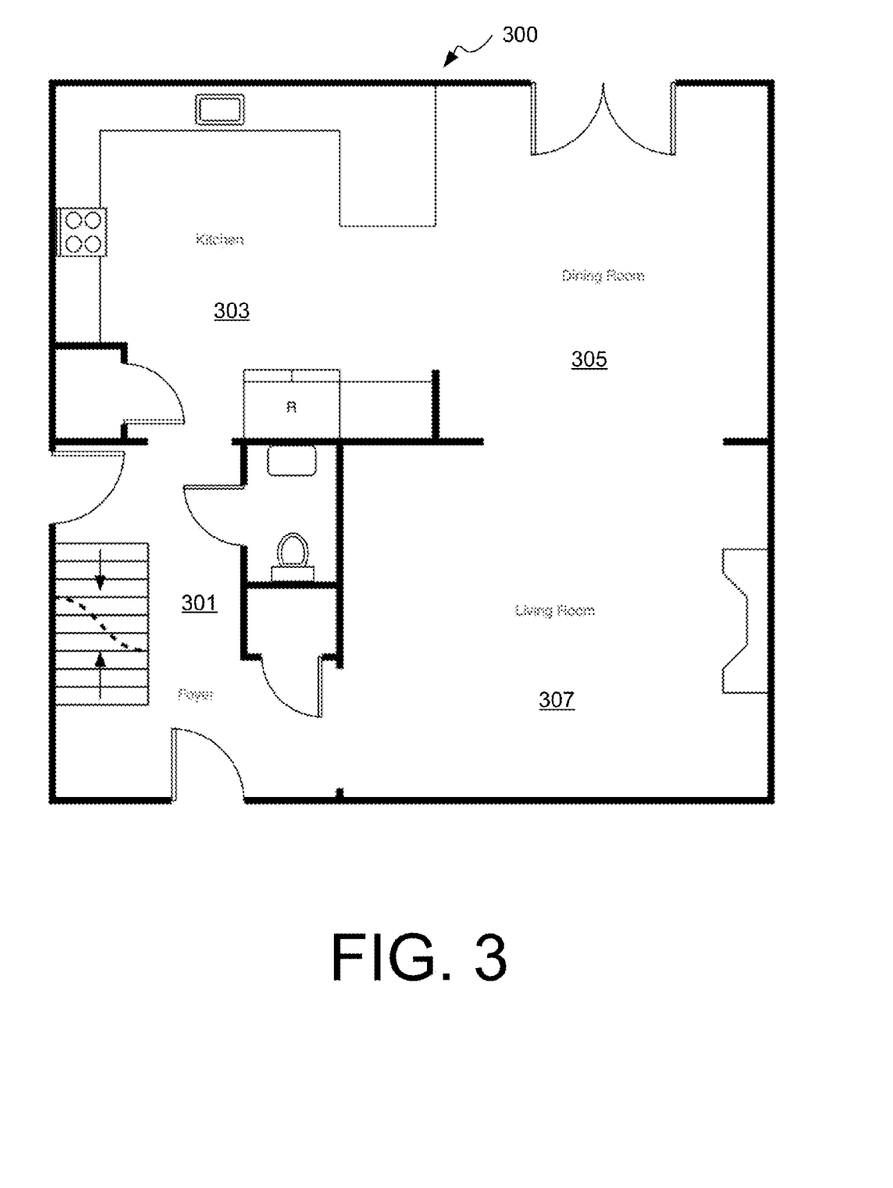
FIG. 3 illustrates an example environment in which one or more aspects described herein may be used.

FIG. 3 illustrates an example environment in which granular location and contextual information may be determined to more specifically target information delivery. The illustrative location 300 may correspond to a house, in one example, and include a variety of rooms including foyer 301, kitchen 303, dining room 305 and living room 307. The delineation of sub-locations is not limited to specific rooms within a building or location and may include floors/levels, different functional areas of a location, areas occupied by different entities and the like. Location 300 may also represent an office, institution, business or any other location or facility having different rooms or user areas therein. An information targeting and delivery system may identify each of the sub-locations 301, 303, 305 and 307 based on attributes of devices situated in each of those sub-locations (or more granular locations) 301, 303, 305 and 307. For example, living room 307 and kitchen 303 may each include a display device such as a television, a monitor and/or other type of display. These display devices may be configured with network access or other types of communication capabilities to transfer data to and from an information targeting and delivery system. Accordingly, the information targeting and delivery system may be able to access to the display devices and obtain various data including location-identifying attributes from the devices through a communication network. In a particular example, the display devices may include or be associated with a content rendering device configured to receive content such as scheduled or on-demand programming from the information targeting and delivery system. In some arrangements, the information targeting and delivery system may be located remotely, e.g., as part of a head-end of a programming distribution network or system.

While an information targeting and delivery system may identify general geographic location (latitude/longitude, address, zip code, etc.) using various technologies based on GPS, orientation, network address, telephone number and the like, additional levels of location granularity might not be achievable without manually (e.g., user) specified information. For example, in some arrangements, users may assign location-identifying information and attributes to devices. Such information may include a name of the device, a location of the device, users associated with the device and the like. Based on this information, the information target and delivery system may more specifically identify the types of content to be delivered to those spaces within locations. For example, if a display device is located in living room 307 and a name or location attribute of a device has been specified as "living room," the information target and delivery system may search for content, such as advertisements, movies, shows, music and the like, that may be more appropriate or otherwise specific to a living room. Since living rooms are typically furnished with seating, for instance, the information targeting and delivery system may select and prioritize advertisements relating to sofas and recliners over advertisements relating to computers or construction tools.

In another example, if the information targeting and delivery system detects a device named "kitchen," the system may infer that the device is located in a kitchen, such as sub-location 303. Accordingly, when determining the type of content or other information to deliver or recommend to the device, the system may select kitchen-related content such as cooking shows, recipes, advertisements relating to kitchen equipment and the like. Without the manually specified information, the system might not otherwise be able to recognize the location of the devices with such granularity, e.g., that the location of the device corresponds to the living room or a kitchen. Additionally, the system may infer or otherwise determine other contextual information associated with a device and further particularize the targeted content. For example, the network-connected device in kitchen 303 may correspond to a refrigerator. Using this additional information, the system may recommend or offer even more specific information including advertisements relating to refrigerator accessories or upgrades therefor.

The devices situated in location 300 or sub-locations 301, 303, 305 and 307, are not limited to display devices or content receiving and rendering devices. As shown in the above examples, any device may be connected to a network and provide further contextual information to an information targeting and delivery system including appliances, security systems, digital picture frames, gaming systems, laptops, tablets, furniture, clocks, thermostats, music players and the like. Moreover, multiple devices may be situated in the same location or sub-location and thus, offer combinations and layers of contextual data for further enhance targeting specificity. The system may thus target and deliver information specifically to a location or sub-location or specifically to a particular device within the location or sub-location. In the above example of the refrigerator-equipped kitchen, targeted content such as advertisements may be delivered to a display device co-located with the refrigerator in the kitchen. If the refrigerator includes a display device, different advertisements or content may be delivered to the refrigerator as compared to the other co-located display device. Alternatively, such advertisements may also be targeted for and delivered to other locations such as a television in the living room on the assumption or inference that individuals who cook might often watch television in the living MOM.

As will be described in further detail below, the information targeting and delivery system may target content based on attributes and parameters other than the identity of a location. For example, the system may also account for a user in the location, devices in the location, activities performed in the location, content and types of content previously delivered to a device or location, and/or information inferred or otherwise determined from user input. For example, if a user is located in a particular location such as the foyer, the system may use the identity or other attributes of the user in selecting information to deliver to the foyer. In another example, a genre of a previously viewed movie in the living room may be used to further refine a selection of content such as television shows to be targeted to the living room. In still another example, an information targeting and delivery system may obtain information from user input such as a voice command to infer contextual attributes. The user input may include a command such as "Tune to a football game in the bedroom." Based on this command, the system may infer that the user prefers to watch sports and, more specifically, football, in a particular location, the bedroom. Other types of contextual attributes that may be gleaned from user input include user activity habits such as types of activities performed by the user and/or preferred locations of the user (e.g., generally or for a particular activity). Thus, if a user provides input such as "Change input of display in basement to gaming console," the system may associate gaming with the basement and a user issuing the command. A variety of other types of information may be similarly inferred or explicitly determined based on user input. Such information may be stored in association with a location, a user or both for future information targeting analysis.

Figure 4:
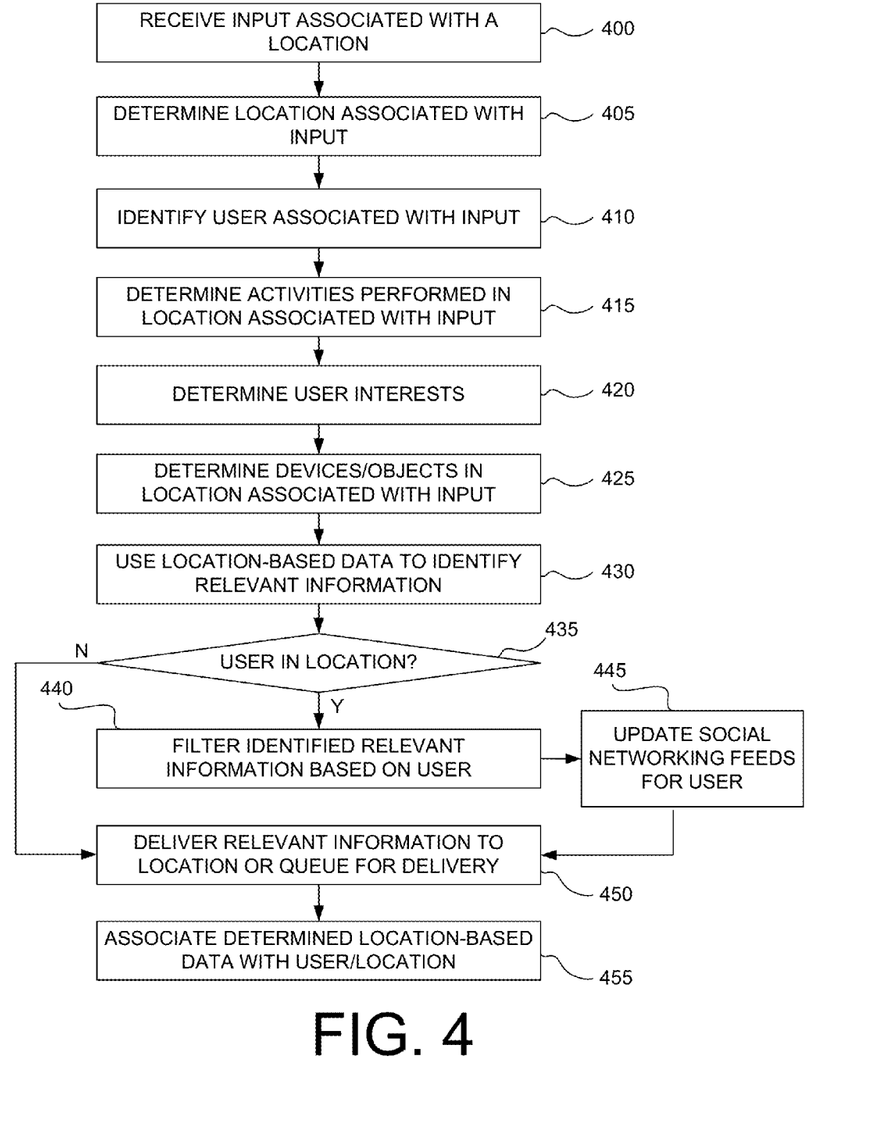
FIG. 4 is a flowchart illustrating an example information determining and targeting process according to one or more aspects described herein.

FIG. 4 is a flowchart illustrating an example process by which content selection parameters may be determined and content may be selected and targeted for a particular room or location within a premises based on the selection parameters. In step 400, an information targeting and delivery system may receive information relevant to a particular location. Information may be received via user input, or acquired via other sources such as sensors or databases. Subsequently, in step 405, the system may determine the location associated with the user input. The relevance of the user input to the particular location may relate to a variety of situations. In one example, the user input may correspond to a command for controlling a device situated in the location. The command may include tuning a device to particular content or a content channel, changing an input source of the device, scheduling a program recording, turning on/off a device (e.g., turning on a music player or starting a coffee machine) and the like in some examples. Accordingly, the location of the device may be specified in or determined from the user input and may be extracted therefrom. In a particular example, the system may parse a command such as "start brewing coffee in the kitchen" or "record my favorite show in the living room," to identify the corresponding location. In another example, user input may be received through a device associated with a particular location such as a streaming music player named "Study" or "Jane's Bedroom." As such, commands and other information provided in the user input may be automatically associated with that location (e.g., if no other location information is provided).

According to some arrangements, if a device through which the user input is received does not offer location-identifying data and the user input does not specify a location, the system may be unable to determine a granular location according to the above scenarios. In such situations, the system may determine granular location information using co-location. For example, the system may determine whether the device through which user input was received is co-located with another device for which a location is known. In a specific example, a user may input a command such as "What sci-fi movies are on?" or "I want to watch Judge Dredd," through a mobile device (e.g., tablet, mobile phone, etc.). Upon receipt of the input and recognition that granular location information is not provided by the device or in the user input, the system may determine whether the mobile device is co-located with a device having a known location such as a television, refrigerator, streaming music device and the like. If so, the location of the mobile device may be assigned as the known location. Co-location may be performed by triangulation, GPS tracking, audio processing and/or video processing. Audio processing and video processing for co-location are described in further detail below.

In step 410, the system may determine a user associated with the received input, if such information is available. For example, a user may use an application to provide the user input. In such an instance, the user may be required to login to the application or a service in order to access certain functionality such as control of other networked devices, submitting a search or inquiry, retrieving information or content and the like. Alternatively or additionally, the system may require the user to identify himself or herself by submitting a name or other type of identifier (with or without logging in) upon activating a system, service, application or device through which the user input is submitted. Accordingly, the system may determine the user providing the input through the login information. In other examples, the system may identify the user based on a device from which the user input was received and pre-registered user information associated with the device. In still other examples, the system may be configured to perform voice recognition on audio input to identify the user.

Once the location and user (if available) have been identified, the system may subsequently determine (e.g., by inferring or extracting) contextual information, e.g., from the user input or other sources. As described above, user input may offer contextual data relating to a variety of attributes associated with the location or user including types of activities performed, habits, devices in the location and/or used by the user, user preferences, user interests, user schedules (e.g., location of a user at particular times), a function of the location, a schedule of functions of the location and the like. For example, in step 415, the system may determine or predict an activity being or to be performed in the identified location. Accordingly, when a user provides input such as "What sci-fi movies are on right now" in the bedroom, the system may infer that the user watches movies in the bedroom. In another example, when a user provides the command "Turn on aerobics in the living room," the system may determine that aerobics are performed in the living room. In still another example, the user may input a command to activate a bedside lamp. In response, the system may infer that reading is performed in the bedroom as well. The identification of activities may be performed, in one arrangement, by parsing the user input and correlating known activity names with words or commands issued by the user. For example, a database of activities may be predefined for look-up purposes in activity identification processes. A schedule of functions or activities typically performed in the location may also be determined. For example, if a user asks to watch movies in the evening and sports in the afternoon, the system may determine that the location is used to watch movies after 8 PM while sports are viewed in that location between the hours of noon and 4 PM. The system may further determine user interests, e.g., associated with a particular room or location, based on the user input in step 420. In the above example relating to a sci-fi movie inquiry, the system may determine that science-fiction and science-fiction movies are an interest of the user or an interest associated with that location. Alternatively, a user inquiry regarding what hockey games are on the radio in the bedroom or what hockey podcasts are available may signify an interest in hockey.

In step 425, the system may further determine whether other devices or items are situated within the same location. For example, if a user's input corresponds to changing an input source on a display to an input named "GAME," the system may infer that the location includes not only the display, but also a gaming console. In another example, a user may issue a command such as "Remind me to microwave popcorn at 3:00 PM," the system may further infer that the kitchen includes a microwave. In still another example, a request for a roast chicken recipe may offer the information targeting and delivery system a hint that the kitchen includes an oven. Co-location may also be evaluated based on connection information. For example, all devices connected to the same network access point may be assumed to be or defined as being co-located. Alternatively or additionally, if the location of the network access point is known, all devices connected thereto may be presumed to be in the same location. As will be appreciated, a variety of other types of information may be inferred from user input and is not limited to activity types, co-located devices and user interests.

In step 430, the system may use the available information, e.g., extracted from the user input or determined or learned from other sources, to formulate and execute a search for content to target and deliver to the determined location. The extracted information may be used, for example, as keywords in a search phrase applied against a database of content such as advertisements, movie recommendations, product recommendations and the like. In some arrangements, the information obtained from the user input may be weighted to emphasize relative importance between the various pieces of contextual data. In a particular example, a search parameter may be weighed more heavily if the same parameter has been more frequently detected in a pool of other user inputs or associated with a particular location. Other user input may include other user input from the same user (e.g., may include user input associated with other locations), other user input associated with the same location (e.g., may include user input from other users) and/or a combination thereof (e.g., user input specific to the particular user and associated with the particular location). In addition to weighting, historical information such as a history of user input from the same user or other users having one or more similar characteristics may be used to add additional search terms or parameters for further refinement.

In step 435, the system may determine whether a particular user is located in the determined location. In one example, the system may make such a determination based on determining whether a known device within the determined location is co-located with a device through which input was received. For instance, if the known device is the same as the input device, the system may determine that the user is in the same location. In another example, if the user enters the input through a mobile device such as a tablet or smartphone or other device, the system may determine whether audio and/or video signatures correspond between the tablet or smartphone and the device known to be in the determined location.

Figure 5:
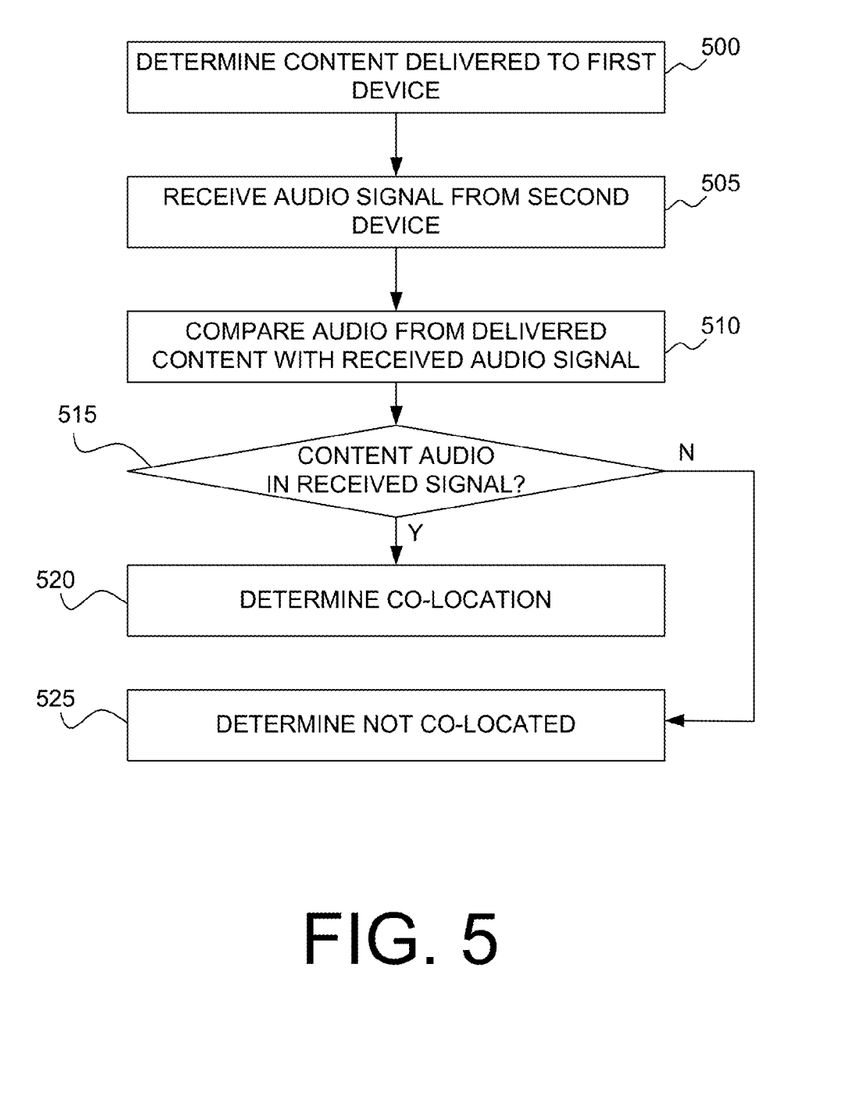
FIG. 5 is a flowchart illustrating an example co-location analysis process according to one or more aspects described herein.

FIG. 5 is a flowchart illustrating an example process by which co-location between two devices may be analyzed using audio signatures. Analyzing co-location according to the example process may involve having connections with both devices and having knowledge of content delivered to at least one of the devices. The system may initially confirm that the at least one of the devices is currently active and consuming content (e.g., rendering, playing, displaying versus just receiving) so that the audio and/or video processing may be performed. In step 500, the system may determine the content delivered to one of the two devices (e.g., a first device). For example, the system may be responsible for selecting and/or delivering content to connected devices and thus, may have stored data identifying the distributed content. In other arrangements, the system may query a content distribution system to determine the current content being provided to the first device.

In step 505, the system may further receive an audio signal from the second device. The first device, in some examples, may include a display device or content rendering device connected to a content distribution network while the second device may correspond to a user input device such as a tablet, remote control, smartphone, mouse and the like. The second device may be required to have audio detection capabilities to support the co-location process. The audio signal received in step 505 may correspond to audio detected by the second device using a microphone or other audio detection device. In one example, the system may request an audio signal having a specified sample length such as 5 seconds, 10 seconds, 15 seconds, 30 seconds, 1 minute and the like. The system may also require audio quality of a threshold level. Accordingly, if the audio signal is either shorter than the required length or is of a lower quality than the requisite threshold quality level, the system may re-request or otherwise obtain another audio sample from the second device.

In step 510, the system may compare the audio received from the second device with known audio from the delivered content. In comparing the audio signal with the known audio, the system may initially identify a portion of the delivered content corresponding to the time at which the audio signal was recorded by the second device. For example, the audio signal from the second device may include one or more time stamps and/or duration, from which a beginning and end time (e.g., clock time) may be derived. The system may then determine a corresponding portion of the content that was being delivered to the first device during that time frame (e.g., between the determined beginning and end times). In other examples, the system may first select a portion of the content to use and subsequently time and initiate audio recording by the second device.

In step 515, the system may determine whether the audio from the delivered content is included in the audio signal received from the second device based on the comparison of step 510. A variety of audio processing techniques may be used to identify whether one signal subsists in another audio signal. If the audio from the delivered content is identified within the second device audio signal, the system may determine that the first and second devices are co-located in step 520. On the other hand, if the audio from the delivered content is determined to not be included in the second device audio signal, the system may determine that the first and second devices are no co-located in step 525, or, alternatively, that the analysis is inconclusive.

Although FIG. 5 has been described with respect to audio analysis, image or video analysis may be performed in a similar fashion to detect whether a known video or image delivered to a first device is included in video or an image captured by the second device. In yet other examples, audio and/or video may be recorded at the same by the first and second devices and compared for similarity. If the audio and/or video from the two devices have a threshold level of similarity, co-location may be found in such a situation as well.

Referring again to FIG. 4, if the user is determined to be in the location (e.g., based on co-location analysis), the system may further filter the identified relevant information based on user characteristics in step 440. The filtering process may be applied to more precisely target information to the user, knowing that the user is present to consume the information/content and not just providing user input relevant to the location, remotely. For example, the information may be filtered based on gender, age, income level, occupation, pre-registered/manually-specified user interests and the like and/or combinations thereof. Additionally or alternatively, the system may update a social networking feed or site (e.g., TWITTER, FACEBOOK, etc.) for the user based on the information gleaned from the user input and content being delivered to the user location in step 445. Since the system has determined that the user is in the location, the system may update the user's social network site or feed to identify content currently being consumed. For example, an update may state "User X is watching The Lord of the Rings," or "User X is playing Xbox," or "USER X just turned on the television." This automatic updating based on determining the user's location and current activity or activities may alleviate the user from manually posting activity information. In some examples, the user may configure the information targeting and delivery system with login information for the user's social network accounts and provide parameters associated when and what to post. Additionally, the user may specify privacy settings including identifying individuals or groups of individuals to which certain types of information are to be accessible.

In step 450, the selected information (filtered or unfiltered) may be delivered and/or queued for delivery to the determined location. For example, if advertisements are to be displayed at certain times or on certain interfaces, the system may queue the selected information for those times or interfaces. Delivery to the location may include selection of a device known to be in the determined location and transmission of the information to the device. Alternatively, the selected information may be delivered to a device through which the user input was received. In some arrangements, the selected information may be immediately delivered to the location. In other examples, the selection of the information might not be performed until an appropriate time or upon detection of a corresponding trigger (e.g., commercial breaks, user browsing an on-demand menu, etc.). In still other examples, the selected information might only be delivered in response to determining that a determined user is in the determined location (e.g., based on co-location analysis). Delivery may include transmission from a server device to a user device or a device located in the determined location and/or presentation of the information at the determined location. Accordingly, while information may be transmitted to the determined location, the information may be queued for presentation (e.g., until a specified time or trigger, until the user is located in that location, etc.). In other examples, the information may be queued for transmission to the determined location or device.

In step 455, the system may further store the determined information such as the determined activities, user interests, identified co-located objects/devices and the like. The system may save the information to further refine search database. For example, such information may be useful in situations where a new location or user is introduced to the system and information is to be selected for delivery. In such a case, the system may use common interests, activities, co-located objects or devices for selecting information for the new location or user. Additionally or alternatively, the determined parameters/data may be stored in association with the user and/or with the determined location. The data may be stored in association with a specific user, a type of user, a user characteristic, a specific location, a type of location (e.g., a general type of room), a location functionality or other attributes the like and/or combinations thereof. Accordingly, using the contextual information determination processes described herein, additional characteristics and information about a user location and/or about the user may be determined. These additional characteristics and information may offer an information targeting system with an improved ability to identify information suitable, relevant and/or otherwise appropriate for a particular location and/or user.

Figure 6:
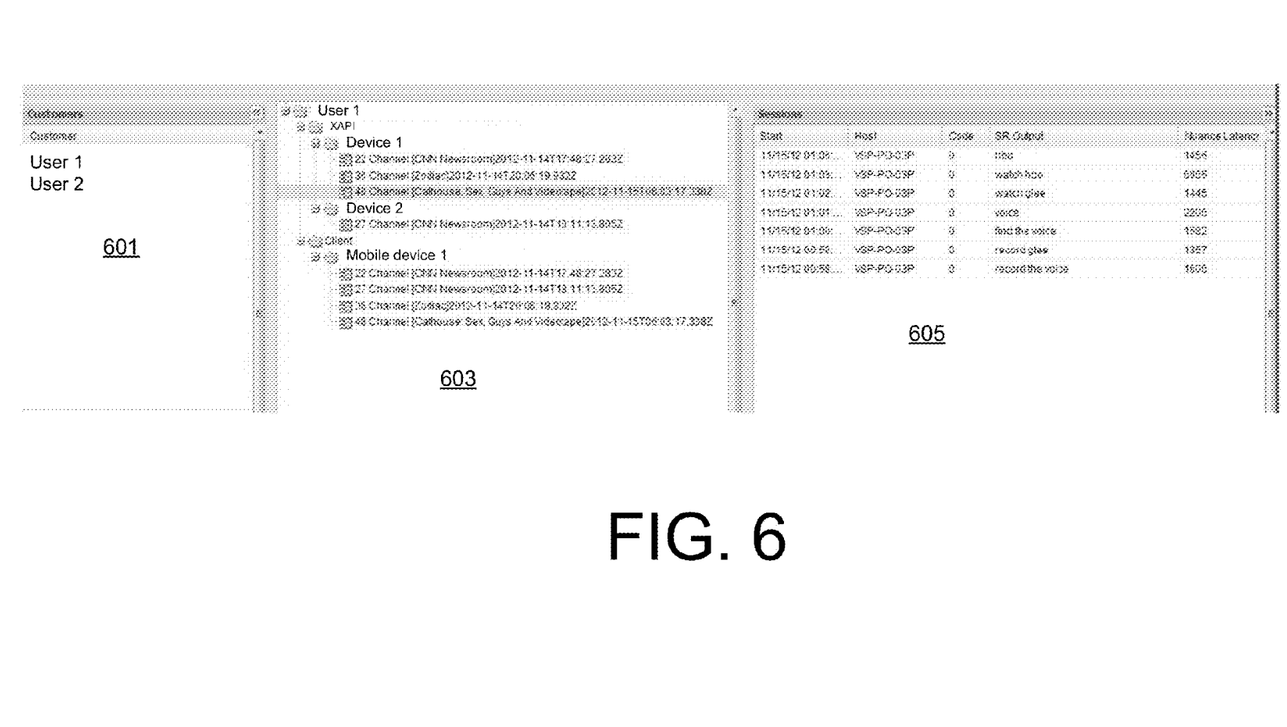
FIG. 6 illustrates an example interface through which user input, history information and contextual data may be collected and tracked according to one or more aspects described herein.

FIG. 6 illustrates an example of data or an interface through which a location or device may be tracked based on the content consumed at that location or by the device. Additionally, information regarding commands, inquiries and other user input may also be collected and associated with the location or device. In portion 601, for example, a list of users registered with the system may be provided. Accordingly, the system may sort collected user input and contextual information on a user-by-user basis and sort the data based on the same. In portion 603, upon selection of one of the users in portion 601, the system may display devices such as Device 1, Device 2 and Mobile Device 1 associated with the user. For example, if the user registers for a service, the user may also register various devices through which the user may wish to access the service. The devices may also have user-assigned names such as "Living Room," "Bedroom 1," "Joe's Tablet" and the like. As discussed, these names may be used to extract contextual data such as granular locations to refine information targeting and delivery.

As shown in the example of FIG. 6, devices may be organized according to a type of client or hardware used. In portion 603, Devices 1 and 2, for instance, are devices that are configured to operate using XAPI while Mobile Device 1 may use a mobile application client. Portion 603 may further provide history information for each device. History information may relate to content or information viewed or otherwise consumed through that device. In one example, the commands/input specified in portion 605 may correspond to a record of user input received through a device highlighted in portion 603. Alternatively or additionally, upon selection of one of the history items, portion 605 may display a history of user input received through the device during that period of time (e.g., when the content corresponding to the history item was being consumed). Accordingly, the user input may be stored in association with not only the device and location associated with the device, but also an associated user. This information may then be collected to define information selection parameters and preferences for locations, devices and/or users.

The methods, systems and other features described herein may further be implemented through any number of computer readable media (e.g., memory) that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of the IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

I claim:

1. A method comprising:
   receiving, by a computing device and from a user-input device, a request for content;
   in response to determining that the request for content does not specify a particular location for receiving the content, determining whether the user-input device is co-located with a content-outputting device having a first location by:
   determining, by the computing device, audio content being transmitted to and output by the content-outputting device;
   transmitting, by the computing device and to the user-input device, a request for the user-input device to capture audio content detected by the user-input device;
   receiving, by the computing device and from the user-input device, the audio content detected by the user-input device;
   comparing, by the computing device, the audio content detected by the user-input device with the audio content being transmitted to and output by the content-outputting device; and
   in response to determining that the audio content detected by the user-input device matches, within a similarity threshold, the audio content being transmitted to and output by the content-outputting device, determining that the user-input device is co-located with the content-outputting device at the first location; and
   in response to determining that the user-input device is co-located with the content-outputting device at the first location, causing transmission of the content to the content-outputting device.

2. The method of claim 1, wherein the first location is a particular room of a building.

3. The method of claim 1, further comprising:
   determining a user from which the request for content was received; and
   determining different content based on the user and an activity performed at the first location; and
   causing transmission of the different content to the content-outputting device.

4. The method of claim 1, further comprising:
   determining, from a topic associated with a user input, that a different device is located at the first location.

5. The method of claim 1, further comprising:
   updating a social networking feed of a user based on information from the request for content in response to determining that the user is co-located with the content-outputting device.

6. The method of claim 1, further comprising receiving a user-defined tag assigned to the content-outputting device.

7. The method of claim 1, wherein the request for content comprises natural language user input.

8. The method of claim 1, further comprising determining different content to transmit to the content-outputting device based on the user-input device being co-located with the content-outputting device.

9. The method of claim 1, further comprising determining different content to transmit to the content-outputting device based on a type of activity performed at the first location.

10. The method of claim 1, further comprising determining different content to transmit to the content-outputting device based on a type of content consumed or rendered at the first location.

11. The method of claim 1, wherein the determining the audio content being transmitted to and output by the content-outputting device comprises:
    confirming, by the computing device, that the content-outputting device is currently active; and
    querying a content distribution system to determine the audio content being transmitted to and output by the content-outputting device.

12. A method comprising:
    receiving, by a computing device and from a first device, user input associated with a user;
    in response to determining that the user input does not specify a location for receiving content, determining, by the computing device, whether the user is co-located with a second device by:
    determining audio content being transmitted to and output by the second device;
    requesting the first device to capture audio content detected by the first device;
    receiving, from the first device, an audio signal corresponding to the audio content detected by the first device;
    determining whether the audio signal comprises the audio content being transmitted to and output by the second device by comparing the audio content detected by the first device with the audio content being transmitted to and output by the second device; and in response to determining that the audio signal comprises the audio content being transmitted to and output by the second device, determining that the user is co-located with the second device; and in response to determining that the user is co-located with the second device, selecting, by the computing device, information for transmission to the second device based on the user being co-located with the second device; and causing transmission of the information to the second device.

13. The method of claim 12, further comprising:
in response to determining that the user is not co-located with the second device;
queuing the information for transmission;
monitoring for co-location between the user and the second device; and
transmitting the information in response to detecting co-location of the user with the second device.

14. The method of claim 12, wherein the user input comprises voice input.

15. The method of claim 12, further comprising updating a social networking feed of the user based on the user input in response to determining that the user is co-located with the second device.

16. The method of claim 12, wherein determining whether the user is co-located with the second device comprises:
determining video content being transmitted to the second device;
receiving a video signal from the first device; and
determining whether the video content is included in the video signal.

17. The method of claim 12, wherein selecting the information is further based on a type of activity performed at a location of the second device.

18. A method comprising:
receiving, by a computing device and from a first device, a request for content;
in response to determining that the request does not specify a location for receiving the content, determining whether the first device is co-located with a second device by:
determining, by the computing device, audio or video content being transmitted to and output by the second device;
transmitting, by the computing device and to the first device, a request for the first device to capture audio or video content detected by the first device;
receiving, by the computing device and from the first device, at least one of an audio signal or a video signal corresponding to the audio or video content detected by the first device;
determining, by the computing device, whether the at least one of the audio signal or the video signal matches at least a portion of the audio or video content being transmitted to and output by the second device; and
in response to determining that the at least one of the audio signal or the video signal matches the at least the portion of the audio or video content being transmitted to and output by the second device, determining that the first device and the second device are co-located.

19. The method of claim 18, further comprising:
determining a time at which the at least one of the audio signal or the video signal is captured by the first device; and
identifying a portion of the audio or video content being transmitted to and output by the second device at the time.

20. The method of claim 18, wherein the determining that the at least one of the audio signal or the video signal matches the at least the portion of the audio or video content being transmitted to and output by the second device is based on a similarity threshold.

* * * * *

UNITED STATES PATENT AND TRADEMARK OFFICE
CERTIFICATE OF CORRECTION

PATENT NO. : 9,544,720 B2
APPLICATION NO. : 13/836239
DATED : January 10, 2017
INVENTOR(S) : George Thomas Des Jardins It is certified that error appears in the above-identified patent and that said Letters Patent is hereby corrected as shown below:

On the Title Page

Page 2, Column 1, Other Publications, Line 3:
Please delete "Mar. 13," and insert --Mar. 12,--.

In the Specification

Column 7, Detailed Description, Line 6:
Delete "MOM." and insert --room.--.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*